(12) United States Patent
Qiu et al.

(10) Patent No.: US 7,266,282 B2
(45) Date of Patent: Sep. 4, 2007

(54) FIBER ARRAY FOR OPTICAL COMMUNICATION AND METHOD OF MANUFACTURING THE FIBER ARRAY

(75) Inventors: Jiangron Qiu, Nara (JP); Kazuyuki Hirao, Kyoto (JP); Shuhei Yoshizawa, Shiga-Ken (JP); Tamotsu Yajima, Shiga-Ken (JP); Futoshi Ishii, Shiga-Ken (JP)

(73) Assignee: Kohoku Kogyo Co., Ltd., Shiga-Ken (JP)

( * ) Notice: Subject to any disclaimer, the term of this patent is extended or adjusted under 35 U.S.C. 154(b) by 0 days.

(21) Appl. No.: 10/521,952

(22) PCT Filed: May 8, 2003

(86) PCT No.: PCT/JP03/05779

§ 371 (c)(1), (2), (4) Date: Jan. 21, 2005

(87) PCT Pub. No.: WO2004/010188

PCT Pub. Date: Jan. 29, 2004

(65) Prior Publication Data

US 2006/0051045 A1    Mar. 9, 2006

(30) Foreign Application Priority Data

Jul. 23, 2002 (JP) ............................. 2002-214043

(51) Int. Cl.
*G02B 6/00* (2006.01)
(52) U.S. Cl. ...................................... 385/137
(58) Field of Classification Search ................ 385/14, 385/49–52, 65, 83, 134–137
See application file for complete search history.

(56) References Cited

U.S. PATENT DOCUMENTS

| | | | | |
|---|---|---|---|---|
| 5,185,846 A | * | 2/1993 | Basavanhally et al. | 385/137 |
| 5,528,719 A | * | 6/1996 | Yamada | 385/137 |
| 6,240,235 B1 | * | 5/2001 | Uno et al. | 385/137 |
| 6,298,192 B1 | | 10/2001 | Yoo et al. | 385/137 |
| 6,563,998 B1 | * | 5/2003 | Farah et al. | 385/131 |
| 2002/0154882 A1 | * | 10/2002 | Moran | 385/137 |

FOREIGN PATENT DOCUMENTS

| | | |
|---|---|---|
| CN | 1260503 A | 7/2000 |
| CN | 1346993 A | 5/2002 |
| EP | 0 760 488 | 3/1997 |

(Continued)

*Primary Examiner*—Quyen P Leung
(74) *Attorney, Agent, or Firm*—The Webb Law Firm

(57) ABSTRACT

There is provided a multi-cored fiber array for optical communication which has high dimensional accuracy, can easily be prepared by machining, and is low in cost. There is also provided a fiber array for optical communication which can reduce the necessary amount of an adhesive used for fixing optical fibers to a substrate. The fiber array for optical communication comprises: a substrate for inserting optical fibers therein; and a press plate for pressing and fixing the inserted optical fibers. The substrate has a plurality of grooves into which the optical fibers are to be inserted. The accuracy of the center-to-center dimension between the grooves adjacent to each other is within ±0.5 μm, and the degree of parallelization in the groove length direction between the grooves adjacent to each other is within ±0.1 degree.

3 Claims, 2 Drawing Sheets

PULSED LASER BEAM

FOREIGN PATENT DOCUMENTS

| | | |
|---|---|---|
| EP | 0 760 488 A1 | 3/1997 |
| JP | 64-044403 | 2/1989 |
| JP | 08-019878 | 1/1996 |
| JP | 09-120014 | 5/1997 |
| JP | 1999-174274 | 7/1999 |
| JP | 2002-040293 | 2/2002 |
| JP | 2002-156548 | 5/2002 |

* cited by examiner

FIBER ARRAY FOR OPTICAL COMMUNICATION AND METHOD OF MANUFACTURING THE FIBER ARRAY

TECHNICAL FIELD

The present invention relates to a fiber array for optical communication for use in optical fiber connection and particularly to a multi-cored fiber array for optical communication.

BACKGROUND ART

Increased speed and increased capacity of information transmission in recent years have led to widespread use of information communication using optical fibers. The information communication using optical fibers requires connection between optical fibers themselves or between an optical fiber and optical information equipment. Optical connectors such as ferrules for optical communication and fiber arrays for optical communication have been used for such connection. Demands for size reduction and high-density integration have led to a tendency toward the use of multi-core optical connectors.

Due to the nature of the structure of the optical connector that optical fibers are fitted into and fixed to respective insertion holes formed in a substrate, in order to prevent connection loss of optical fibers, the dimensional accuracy of insertion holes should be regulated on a submicron order from the viewpoint of avoiding deviation of the optical axis of the optical fibers. The adoption of the multi-core or reduced-size optical connector has led to a demand for higher dimensional accuracy.

In the case of conventional fiber arrays or ferrules manufactured by conducting injection molding or extrusion and then subjecting the molding to steps of baking and working, achieving the dimensional accuracy of insertion holes, into which optical fibers are to be inserted, within 1 µm is difficult due to the nature of the process.

To overcome this difficulty, for example, Japanese Patent Laid-Open No. 174274/1999 describes a structure in which V-shaped grooves are formed in a substrate such as a silicon dioxide or silicon substrate and optical fibers are held and fixed by a press cover. In this working method, unlike the above molding technique, V-shaped grooves are formed on a substrate by cutting, and finish processing is performed with a grind stone. In this method, the V-shaped grooves can be formed with dimensional accuracy within 0.5 µm.

This method, however, is disadvantageous in that the shape of the grind stone should always be corrected in order to keep the dimensional accuracy of V-shaped grooves on a constant level, resulting in poor productivity. Further, a press cover is necessary for holding optical fibers, and, in the case where V-shaped grooves are provided in a multiple array form, this press cover should be laid for each array. This imposes limitation on a size reduction and integration of the array for optical communication. Further, the conventional V-shaped grooves are disadvantageous in that, when optical fibers are inserted into the V-shaped grooves followed by pressing and fixation with the press plate, the gap between the substrate and the optical fibers is so large that the necessary amount of an adhesive used is large and, consequently, stress is applied to the optical fibers at the time of solidification of the adhesive, leading to deteriorated light transmission characteristics.

Accordingly, an object of the present invention is to provide a multi-cored fiber array for optical communication, which has high dimensional accuracy, can easily be prepared by machining, and is low in cost, and to provide a fiber array for optical communication which can reduce the necessary amount of an adhesive used for fixing optical fibers to the substrate.

DISCLOSURE OF THE INVENTION

The above object of the present invention can be attained by a fiber array for optical communication, comprising: a substrate for inserting optical fibers therein; and a press plate for pressing and fixing the inserted optical fibers, said substrate having a plurality of grooves into which said optical fibers are to be inserted, the accuracy of the center-to-center dimension between said grooves adjacent to each other being within ±0.5 µm, the degree of parallelization in the groove length direction between said grooves adjacent to each other being within ±0.1 degree. The formation of grooves with the above dimensional accuracy can provide an optical connector with no significant coupling loss.

In a preferred embodiment of the present invention, the grooves have a U-shaped or V-shaped section. In another preferred embodiment of the present invention, the grooves have a semicircular section, and said press plate also has grooves with a semicircular section located at positions respectively corresponding to the grooves in said substrate. When the V-shaped or U-shaped grooves are adopted, in inserting optical fibers into the substrate, the optical fibers can easily be positioned. Further, when the grooves with a semicircular section are formed in both the substrate and the press plate, in inserting optical fibers into the substrate followed by pressing and fixation of the optical fibers to the substrate by the press plate, the necessary amount of the adhesive used can be reduced.

More preferably, the substrate and a substrate of said press plate are formed of a material selected from the group consisting of glass composed mainly of silicon oxide, glass ceramic, quartz glass, light-transparent alumina, and zirconium oxide. The use of the light-transparent substrate can avoid heat damage to the substrate during laser beam machining.

According to another aspect of the present invention, there is provided a method for manufacturing the above fiber array for optical communication, said method comprising the steps of: forming grooves into which said optical fibers are inserted in said substrate by pulsed laser beam machining; inserting optical fibers into the formed grooves; and joining and fixing said inserted optical fibers to said substrate and said press plate. Preferably, the pulsed laser beam is a femtosecond laser beam.

In a preferred embodiment of the present invention, the method further comprises the step of etching the inner wall of said formed grooves after said laser beam machining. More preferably, the etching is carried out with at least one inorganic acid selected from the group consisting of hydrofluoric acid, hydrochloric acid, nitric acid, and sulfuric acid. The etching treatment can further enhance the processing accuracy.

BEST MODE FOR CARRYING OUT THE INVENTION

The fiber array for optical communication of the present invention and a method for manufacturing the same will be described in detail with reference to the accompanying drawings.

Figure 1:
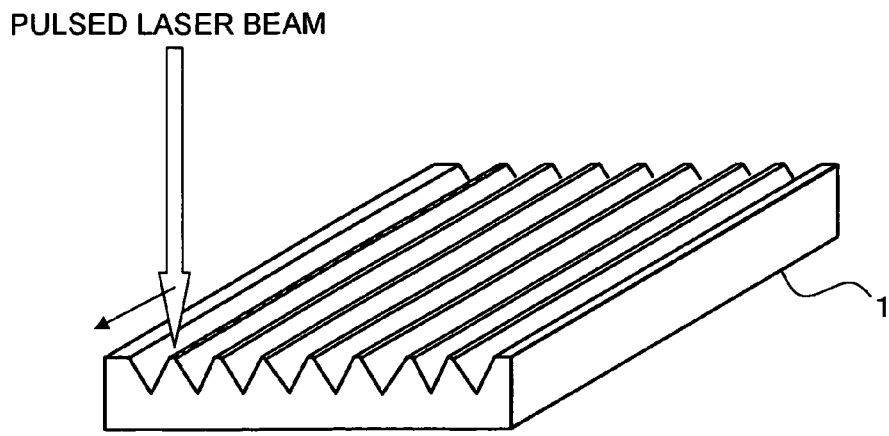
FIG. 1 is a schematic diagram of a fiber array for optical communication in an embodiment of the present invention.

FIG. 1 is a schematic diagram of a fiber array for optical communication in an embodiment of the present invention. A rectangular substrate 1 is first provided as a substrate. The substrate is formed of a transparent material such as glass composed mainly of silicon oxide, a glass ceramic, quartz glass, light-transparent alumina and zirconium oxide, from the viewpoint of preventing heat damage to the substrate at the time of laser beam machining which will be described later. Therefore, the content of impurities such as $Na_2O$, $K_2O$, CaO, and BaO contained in the substrate is preferably not more than 50 ppm. When the impurity content exceeds 50 ppm, the transparency of the substrate is lowered. Prior to boring, the end face of the substrate is subjected to optical polishing.

Grooves are formed in the substrate by pulsed laser beam machining. The substrate is held, and the substrate is registered with a laser irradiation axis. The laser beam is regulated to a predetermined spot diameter with an objective lens. The spot diameter is properly regulated depending upon the outer diameter of optical fibers used.

In boring of the substrate, when glass or the like is used as the substrate, upon continuous application of a high-output laser beam, the substrate in its part exposed to the laser beam causes a rapid rise in temperature which in turn disadvantageously causes cracking of the substrate due to heat shock. For this reason, preferably, a pulsed laser beam is used for the laser beam machining. The pulsed laser beam for machining is not particularly limited, and conventional lasers such as YAG lasers and excimer lasers may be used. Among others, an argon ion-excited Ti-sapphire laser is preferred. "Femtosecond laser" which is suitably used in the present invention refers to one having a laser pulse width of not more than 1 ps.

Figure 2:
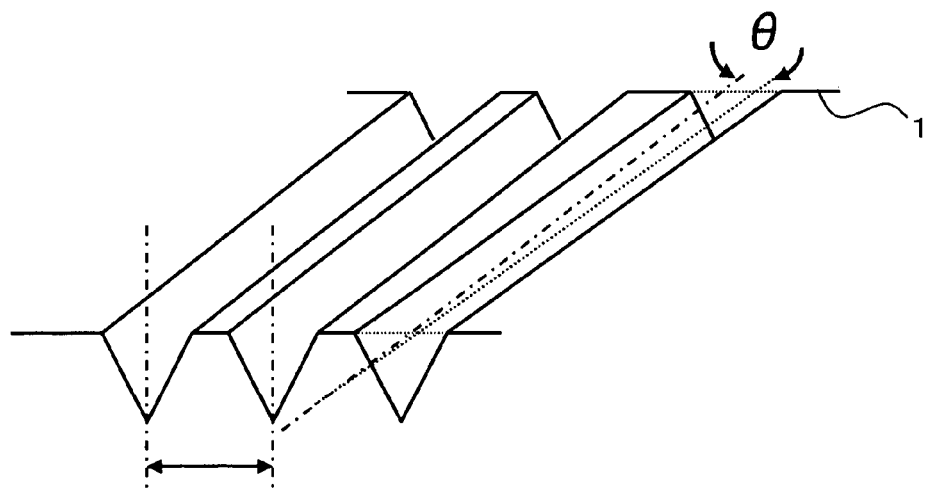
FIG. 2 is an enlarged view of a V-shaped groove part in the fiber array for optical communication according to the present invention.

The formation of the grooves by the pulsed laser beam machining is advantageous in that, even when a plurality of grooves are formed in parallel to each other on the substrate, the accuracy of the center-to-center dimension of adjacent grooves can be brought to ±0.5 μm or less. This can eliminate the need to conduct finish processing for accuracy improvement purposes after groove formation. In addition to the improvement in the center-to-center dimension accuracy of the insertion holes, the axial degree of parallelization of a plurality of insertion holes can be brought to ±0.1 degree or less. Thus, very high-accuracy machining can be realized. As shown in FIG. 2, the center-to-center dimension accuracy of the insertion holes refers to a deviation from the average value of linear distances each defined by connecting the center of one insertion hole end to the center of the adjacent insertion hole. On the other hand, the axial parallel accuracy refers to the angle of the axis of each insertion hole to a reference axis (an axial direction perpendicular to the laser irradiation face of the substrate).

Figure 3:
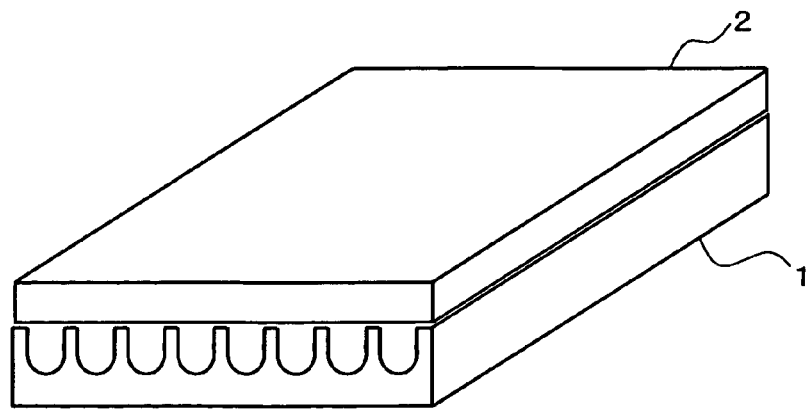
FIG. 3 is a diagram of another embodiment of the fiber array for optical communication according to the present invention.
Figure 4:
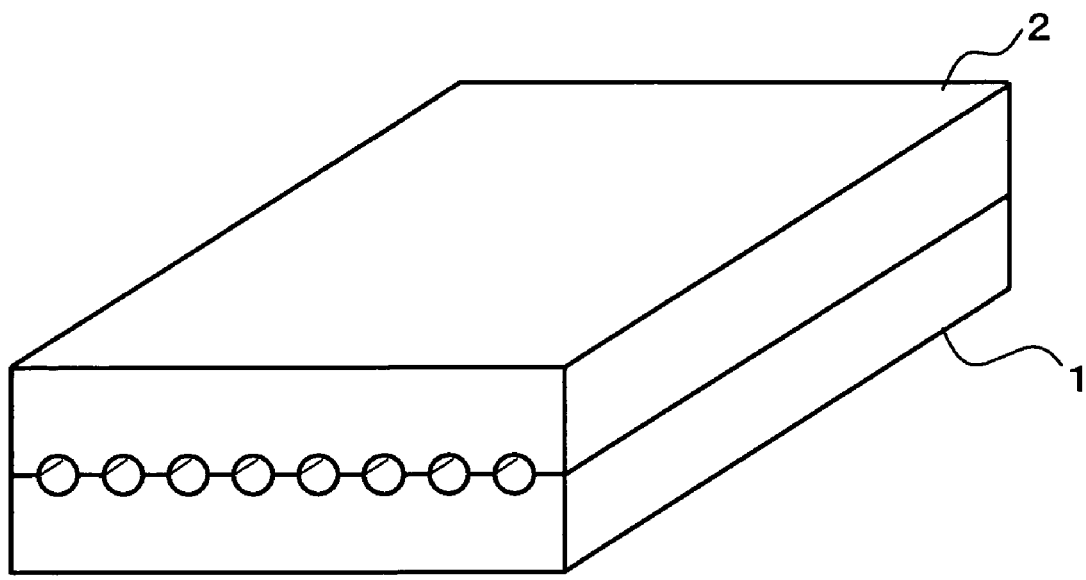
FIG. 4 is a diagram of still another embodiment of the fiber array for optical communication according to the present invention.
Figure 5:
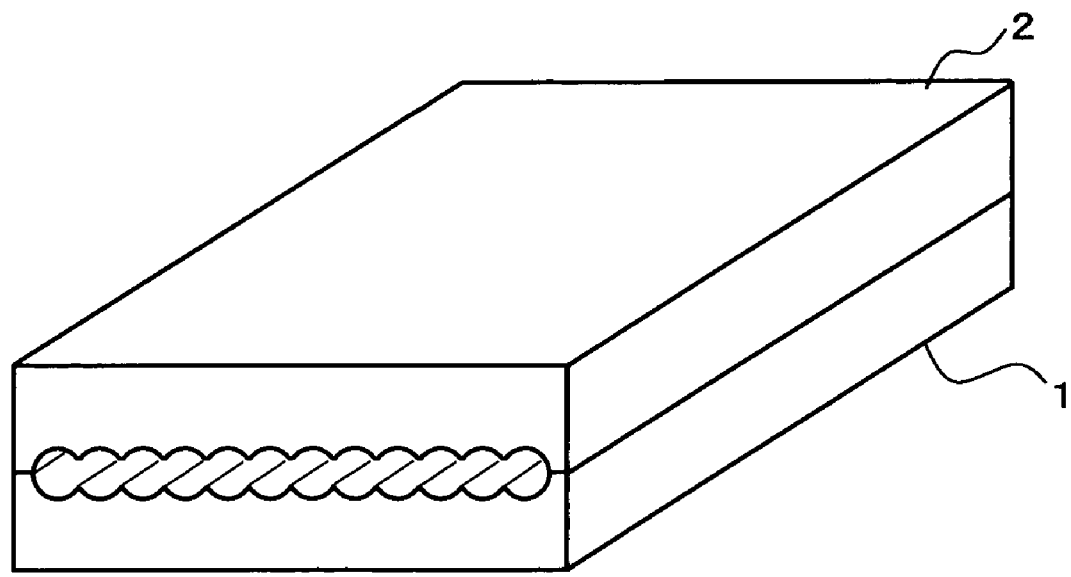
FIG. 5 is a diagram of a further embodiment of the fiber array for optical communication according to the present invention.

The grooves may be formed by machining in a conventional V-shaped form. Alternatively, the grooves may be formed in a U-shaped form as shown in FIG. 3. Further, a construction may be adopted in which as shown in FIG. 4, semicircular grooves are formed on the substrate side and semicircular grooves are also formed on the press plate 2 side. According to this construction, the necessary amount of an adhesive used in inserting and fixing the optical fibers can be reduced. The reduction in the amount of adhesive used can reduce the stress applied to the optical fibers upon the shrinkage solidification of the adhesive and consequently can reduce a deterioration in light transmission characteristics. When the grooves have a U-shaped or semicircular section, the spacing between adjacent grooves can be narrowed and, thus, optical fibers can be laid at higher density. Grooves with any desired section can be formed by properly regulating conditions for laser beam machining, for example, output, pulse width, and scanning speed. It was unexpectedly found that a reduction in spacing between adjacent grooves for high-density arrangement of optical fibers can reduce coupling loss of the optical fibers. This is considered attributable to the fact that, in the formation of a plurality of grooves, the spacing between grooves located at both ends can be reduced by reducing the spacing between the adjacent grooves, contributing to an improvement in dimensional accuracy of the grooves. As shown in FIG. 5, in order to further reduce the hole pitch, the grooves may be formed in the substrate 1 and the press plate 2 so that adjacent holes are connected to each other rather than the formation of grooves with a completely circular section.

The U-shaped and semicircular grooves may be of course formed by a conventional method using a mold technique such as injection molding, extrusion, slip casting or press molding, or by cutting.

In the pulsed laser beam machining, the substrate is heat melted. Therefore, the formed grooves are characterized by a smooth wall surface. In some cases, however, crystal grains are formed in the wall face of the grooves during laser beam machining. Therefore, preferably, after pulsed laser beam machining, the groove wall face is etched to remove the crystal grains. In this case, at least one inorganic acid selected from the group consisting of hydrofluoric acid, hydrochloric acid, nitric acid, and sulfuric acid may be used as an etching solution.

EXAMPLES

Example 1

An LD excited Ti sapphire pulsed laser beam with a pulse repetition frequency of 1 kHz and a center wavelength of 800 nm was condensed with an objective lens (magnification: 5 times) to regulate the spot diameter to 125 μm. The laser beam was applied to a 3 mm-thick rectangular quartz glass substrate (bandgap of the material: 7.9 eV) having a laser irradiation face which had been subjected to optical polishing. Regarding irradiation conditions and machining speed, the pulse width was not more than 130 femtoseconds, the output was 100 mW, and the scanning speed was 100 μm. Eight grooves were formed at intervals of 250 μm in the substrate. Next, the substrate with grooves formed therein was immersed in a 4 wt % aqueous hydrofluoric acid solution for one hr for etching with an ultrasonic cleaner, and the formation of U-shaped grooves was confirmed. The dimension between adjacent grooves was 125 μm±0.5 μm, and the degree of parallelization in the Z axis direction (longitudinal direction of grooves) of the grooves was ±0.05 degree. The center-to-center dimension between both end grooves was 1905 μm±0.4 μm.

Optical fibers were laid in the respective U-shaped grooves. An ultraviolet-curable adhesive was coated, and a press plate formed of the same material as the substrate was pressed against the optical fibers, followed by ultraviolet irradiation for fixation of the optical fibers. Thus, an array for optical communication was prepared.

For the array for optical communication thus obtained, the coupling loss was measured with a collimator. As a result, for the array with a groove interval of 250 μm, the coupling loss was 0.26 dB.

Example 2

In the same manner as in Example 1, U-shaped grooves were formed in the substrate, except that the groove interval was changed to 125 μm. The dimension between adjacent grooves was 125 μm±0.5 μm, and the degree of parallelization in the Z axis direction (longitudinal direction of grooves) of the grooves was ±0.05 degree. The center-to-center dimension between both end grooves was 1000 μm±0.4 μm.

Next, in the same manner as in Example 1, optical fibers were laid in the substrate to prepare an array for optical communication, and the coupling loss was measured with a collimator. As a result, for the array with a groove interval of 125 μm, the coupling loss was 0.16 dB.

Comparative Example 1

A YAG laser beam with a fundamental wave at 1064 nm (double wave 532 nm, triple wave 355 nm) was condensed with an objective lens (magnification: 5 times) to regulate the spot diameter to 125 μm. The laser beam was applied to a 5 mm-thick rectangular quartz glass substrate (bandgap of the material: 7.9 eV) having a laser irradiation face which had been subjected to optical polishing. Regarding irradiation conditions and machining speed, the pulse energy was 5 mJ, and the scanning speed was 100 μm.

As a result, the surface of the substrate was silightly recessed, and no V-shaped groove was formed. Further, the occurrence of microcracks was observed in the substrate surface exposed to the laser beam and the backside of the substrate.

The invention claimed is:

1. A method for manufacturing a fiber array for optical communication, the fiber array comprising: a substrate for inserting optical fibers therein; and a press plate for pressing and fixing the inserted optical fibers, said substrate having a plurality of grooves into which said optical fibers are to be inserted, the accuracy of the center-to-center dimension between said grooves adjacent to each other being within ±0.5 μm, the degree of parallelization in the groove length direction between said grooves adjacent to each other being within ±0.1 degree, said method comprising the steps of:
    forming grooves into which said optical fibers are inserted in said substrate by pulsed laser beam machining;
    etching the inner wall of said formed grooves after said laser beam machining;
    inserting optical fibers into the formed grooves; and
    joining and fixing said inserted optical fibers to said substrate and said press plate.

2. The method according to claim 1, wherein said pulsed laser beam is a femtosecond laser beam.

3. The method according to claim 1, wherein said etching is carried out with at least one inorganic acid selected from the group consisting of hydrofluoric acid, hydrochloric acid, nitric acid, and sulfuric acid.

* * * * *